(12) United States Patent
Ura

(10) Patent No.: US 9,231,468 B2
(45) Date of Patent: Jan. 5, 2016

(54) INTERLEAVED CONVERTER WITH INTER-INDUCTOR SWITCH

(75) Inventor: Shinichiro Ura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/369,456

(22) PCT Filed: Jul. 13, 2012

(86) PCT No.: PCT/JP2012/067991
§ 371 (c)(1),
(2), (4) Date: Jun. 27, 2014

(87) PCT Pub. No.: WO2013/114644
PCT Pub. Date: Aug. 8, 2013

(65) Prior Publication Data
US 2014/0347900 A1 Nov. 27, 2014

(30) Foreign Application Priority Data
Jan. 31, 2012 (JP) .................................. 2012-017949

(51) Int. Cl.
*H02M 3/158* (2006.01)
*H02M 1/42* (2007.01)

(52) U.S. Cl.
CPC .......... *H02M 1/4208* (2013.01); *H02M 1/4225* (2013.01); *H02M 3/1584* (2013.01); *Y02B 70/126* (2013.01)

(58) Field of Classification Search
CPC ............ H02M 3/1582; H02M 3/1584; H02M 3/1588; H02M 2003/1586; H02M 1/4225; H02M 7/2176; H02M 7/23
See application file for complete search history.

(56) References Cited

U.S. PATENT DOCUMENTS 8,917,075 B2 * 12/2014 Leipold et al. ................. 323/284
2011/0110132 A1 * 5/2011 Rausch et al. ................. 363/124

FOREIGN PATENT DOCUMENTS

| JP | 04-211812 A | 8/1992 |
| JP | 2002-247839 A | 8/2002 |

(Continued)

OTHER PUBLICATIONS

International Search Report of the International Searching Authority mailed Oct. 16, 2012 for the corresponding international application No. PCT/JP2012/067991 (with English translation).

*Primary Examiner* — Harry Behm
*Assistant Examiner* — Peter Novak
(74) *Attorney, Agent, or Firm* — Posz Law Group, PLC

(57) ABSTRACT

An interleaved converter configured by connecting a plurality of switching converter circuits in parallel includes an inter-inductor switch that selects whether inductors are connected in series, an input side switch that is connected to a connection point of the inductor and the inter-inductor switch and selects whether electric power is supplied from a rectifier circuit to the inductor side, an output side switch that is connected to a connection point of the inductor and the inter-inductor switch and selects whether electric power is supplied from the inductor to the diode side, and a control circuit that controls the inter-inductor switch, the input side switch, and the output side switch.

8 Claims, 16 Drawing Sheets

(56) References Cited

FOREIGN PATENT DOCUMENTS

| JP | 2003-523156 | A | 7/2003 |
| JP | 2003-348859 | A | 12/2003 |
| JP | 2006-149054 | A | 6/2006 |
| JP | 2010-206941 | A | 9/2010 |
| JP | 2012-016164 | A | 1/2012 |

* cited by examiner

INTERLEAVED CONVERTER WITH INTER-INDUCTOR SWITCH

CROSS REFERENCE TO RELATED APPLICATIONS

This application is a U.S. national stage application of International Patent Application No. PCT/JP2012/067991 filed on Jul. 13, 2012 and is based on Japanese Patent Application No. 2012-017949 filed on Jan. 31, 2012, the disclosures of which are incorporated herein by reference.

TECHNICAL FIELD

The present invention relates to an interleaved converter in which two or more switching converter circuits are connected in parallel.

BACKGROUND

According to a market request for energy saving in these days, there are electrical appliances that continuously operate at extremely low power consumption with respect to the rated power consumption. In electrical appliances including converter circuits, there is a demand for efficient power conversion even during continuous operation at low power consumption.

In particular, in a switching converter in which a semiconductor switch is used, in low power consumption of a load (i.e., a low load), compared with high power consumption of the load (i.e., a high load), the ratio of the power loss of the converter to the input power increases and the converter efficiency is deteriorated. Therefore, various proposals have been made to suppress the converter efficiency deterioration during the low load.

For example, there is proposed a technology for performing control for, when a load requests a relatively low power level, detecting the state of the load, disabling one or more switches among two or more switches according to the detected state to thereby reduce the switching loss and, when additional electric power is required, restoring the one or more already-disabled switches to an operation state to satisfy the power request (e.g., Patent Literature 1).

PATENT LITERATURE

Patent Literature 1: Japanese Translation of International Patent Application No. 2003-523156

TECHNICAL PROBLEM

In the technology described in Patent Literature 1, an inductor connected to a switch disabled, that is, changed to a stop state during a low load is not energized. Therefore, the inductor does not contribute to efficient power conversion. In such an operation method for stopping a switch in a low-power load, an inductor not energized in the low-power load is not significant. In particular, when an operation time in the low-power load is long, effective utilization of the inductor is requested even in the low-power load. However, a literature referring to the effective utilization of the inductor in the low-power load is not laid open to the public.

SUMMARY

The present invention has been devised in view of the above and it is an object of the present invention to provide an interleaved converter capable of effectively utilizing inductors even in a low-power load to further improve converter efficiency and enabling more highly efficient operation.

To solve the above problems and achieve the object, an interleaved converter that is configured by connecting in parallel a plurality of switching converter circuits configured by inductors, switching elements, and diodes, that rectifies, with a rectifier circuit, an alternating-current voltage supplied from an alternating-current power supply, and that switches, with the switching elements, an output voltage of the rectifier circuit via the inductors to perform one or both of power factor improvement and a boosting operation and to supply electric power to a load, the interleaved converter including: an inter-inductor switch that makes it possible to select whether the inductors are connected in series; an input side switch that is connected to a connection point of the inductor and the inter-inductor switch and makes it possible to select whether electric power is supplied from the rectifier circuit to the inductor side; an output side switch that is connected to a connection point of the inductor and the inter-inductor switch and makes it possible to select whether electric power is supplied from the inductor to the diode side; and a control circuit that controls the inter-inductor switch, the input side switch, and the output side switch.

According to the present invention, there is an effect in that it is possible to effectively utilize an inductor even in a low-power load to further improve converter efficiency and enable more highly efficient operation.

DETAILED DESCRIPTION

An interleaved converter according to embodiments of the present invention will be explained below with reference to the accompanying drawings. Note that the present invention is not limited by the embodiments explained below.

First Embodiment

Figure 1:
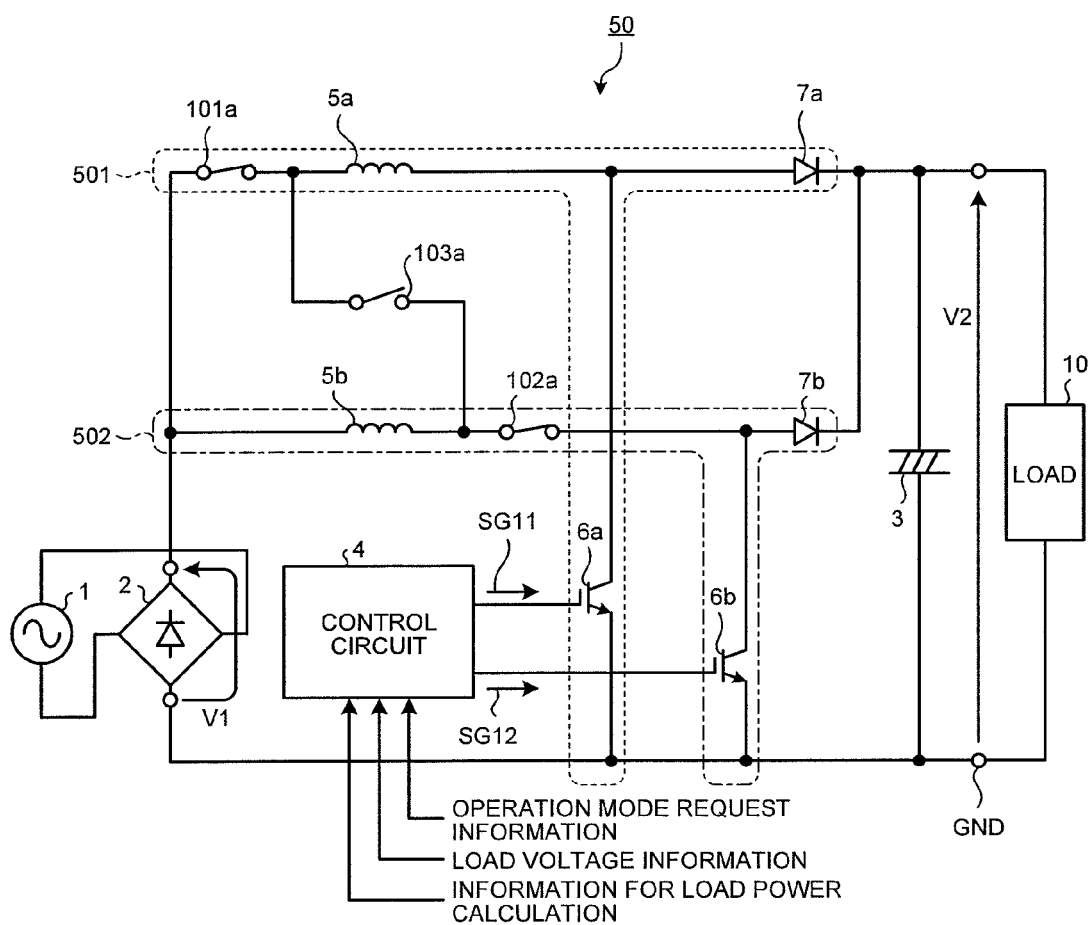
FIG. 1 is a diagram of a configuration example of an interleaved converter according to a first embodiment.

FIG. 1 is a diagram of a configuration example of an interleaved converter according to a first embodiment. As shown in FIG. 1, an interleaved converter 50 according to the first embodiment is configured as a two-circuit parallel interleaved converter and includes two switching converter circuits (hereinafter referred to as "first switching converter circuits") 501 and 502 connected in parallel, a rectifier circuit (a diode bridge) 2 that full-wave rectifies an alternating-current voltage output from an alternating-current power supply 1, a smoothing capacitor 3 that smooths a voltage applied to a load 10, and a control circuit 4.

The first switching converter circuit 501 is configured to include an inductor 5a, a switching element 6a, and a diode 7a. The high-voltage side output end of the rectifier circuit 2 and one end of the inductor 5a are connected via an input side switch 101a. The other end of the inductor 5a and the anode of the diode 7a are connected. The switching element 6a is connected between the connection point of the other end of the inductor 5a and the anode of the diode 7a and the GND.

The first switching converter 502 is configured to include an inductor 5b, a switching element 6b, and a diode 7b. The high-voltage side output end of the rectifier circuit 2 and one end of the inductor 5b are connected. The other end of the inductor 5b and the anode of the diode 7b are connected via an output side switch 102a. The switching element 6b is connected between the connection point of the output side switch 102a and the anode of the diode 7b and the GND.

The connection point of the input side switch 101a and the inductor 5a and the connection point of the inductor 5b and the output side switch 102a are connected via an inter-inductor switch 103a.

The control circuit 4 includes a function of subjecting the switching elements 6a and 6b to switching control and controlling the input side switch 101a, the output side switch 102a, and the inter-inductor switch 103a according to operation mode request information, load voltage information, and information for load power calculation received from the outside.

In this embodiment, the operation mode includes, as operation modes corresponding to load power ranges, a high-load operation mode applied when a power supply amount to the load 10 (hereinafter simply referred to as "load power") is large and a low-load operation mode applied when the load power is smaller than the load power in the high-load operation mode. Note that, in this embodiment, switching of the operation mode is carried out according to the magnitude of the load power or operation mode request information. Note that the operation mode request information is information that a user requests, using, for example, a remote controller (not shown in the figure), an apparatus mounted with the interleaved converter 50 according to the first embodiments to provide.

In this embodiment, the load voltage information indicates an average V2 per predetermined time of a load voltage applied to the load 10 (hereinafter simply referred to as "load voltage V2"). The information for load power calculation is information used in calculating load power and includes instantaneous values of a load voltage applied to the load 10 and a load current flowing into the load 10, instantaneous values of an input voltage and an input current input from the alternating-current power supply 1, or the like. The load voltage, the load current, the input voltage, the input current, and the like are detected by a voltage detecting unit and a current detecting unit that are not shown in the figure. Note that the present invention is not limited by a detection method for the voltages and the electric currents by the voltage detecting unit and the current detecting unit and a calculation method for the load power.

Figure 2:
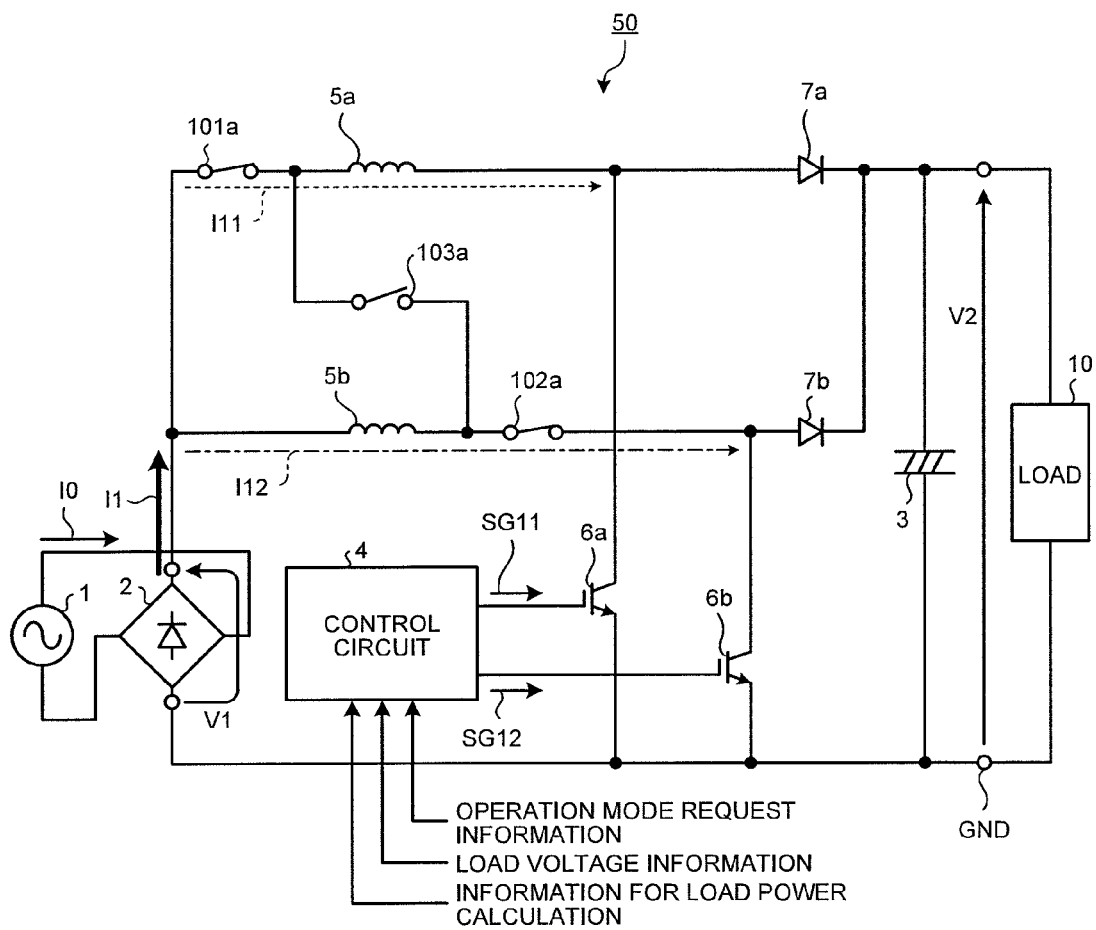
FIG. 2 is a diagram of the configuration of first switching converter circuits during a high-load operation mode of the interleaved converter according to the first embodiment.
Figure 3:
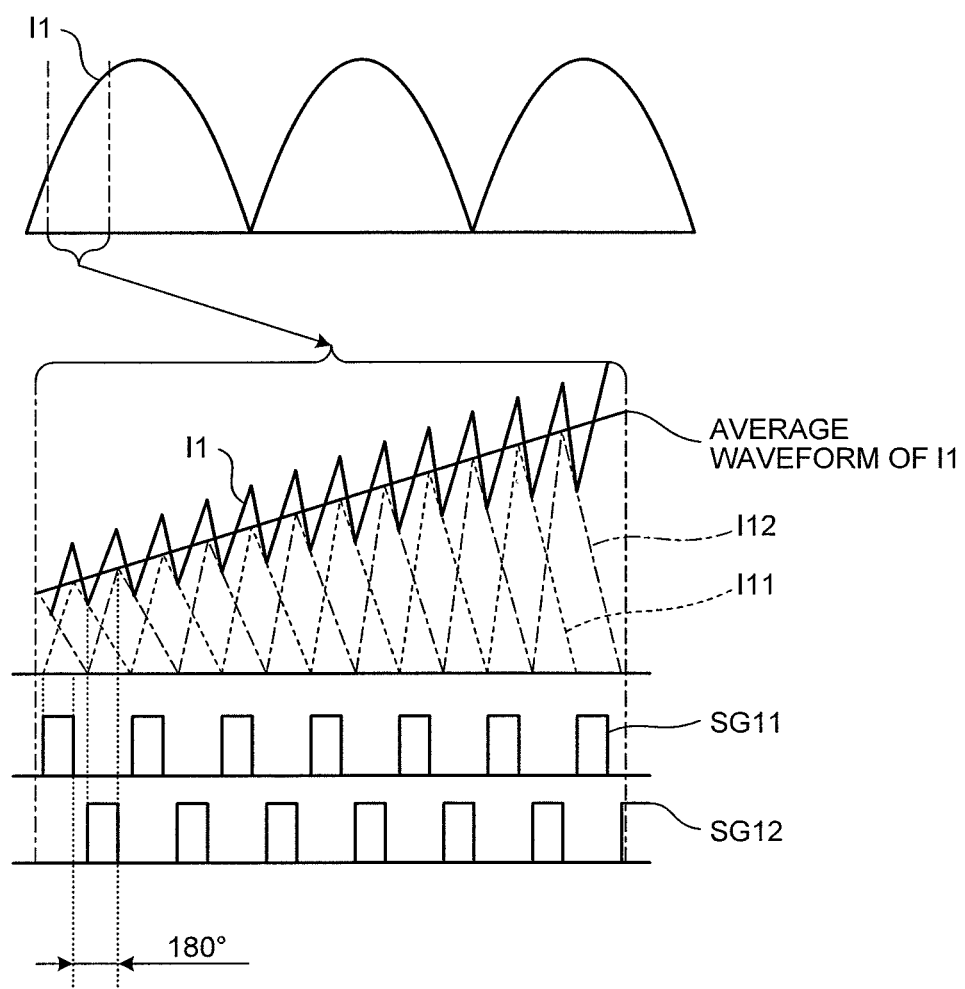
FIG. 3 is a diagram of current waveforms and PWM signal waveforms for causing switching elements to operate during the high-load operation mode of the interleaved converter according to the first embodiment.
Figure 4:
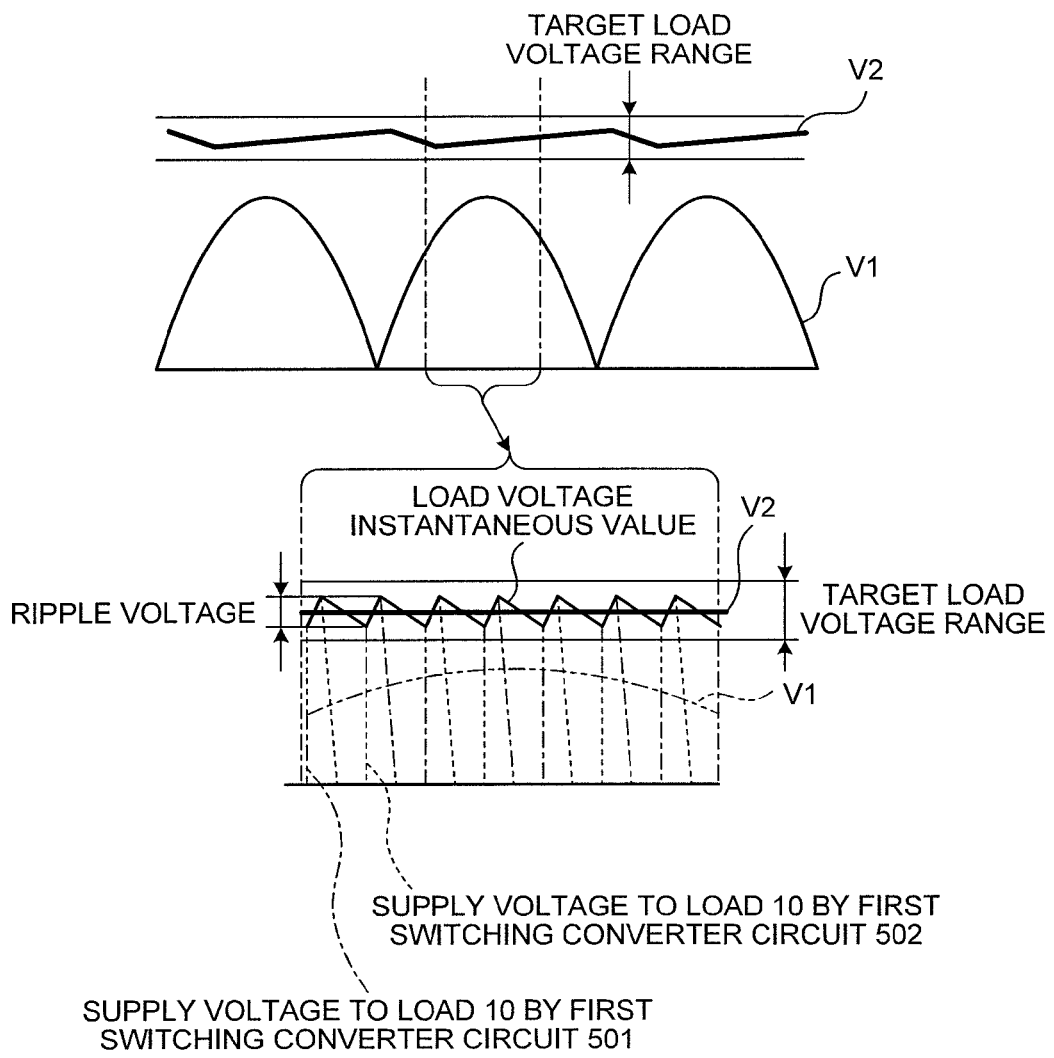
FIG. 4 is a diagram of a full-wave rectified voltage waveform, a load voltage waveform, and a supply voltage waveform to a load during the high-load operation mode of the interleaved converter according to the first embodiment.

Operations during respective operation modes and operation mode switching control in the interleaved converter 50 according to the first embodiment are explained. First, an operation during the high-load operation mode is explained with reference to FIG. 1 to FIG. 4. FIG. 2 is a diagram of the configuration of the first switching converter circuits during the high-load operation mode of the interleaved converter according to the first embodiment. FIG. 3 is a diagram of current waveforms and PWM signal waveforms for causing switching elements to operate during the high-load operation mode of the interleaved converter according to the first embodiment. FIG. 4 is a diagram of a full-wave rectified voltage waveform, a load voltage waveform, and a supply voltage waveform to a load during the high-load operation mode of the interleaved converter according to the first embodiment.

During the high-load operation mode, as shown in FIG. 2, the control circuit 4 subjects the input side switch 101a and the output side switch 102a to ON control and subjects the inter-inductor switch 103a to OFF control. That is, during the high-load operation mode, as shown in FIG. 1, the first switching converter circuit 501 is configured by the inductor 5a, the switching element 6a, and the diode 7a, the first switching converter circuit 502 is configured by the inductor 5b, the switching element 6b, and the diode 7b, and electric currents flow through the paths shown in FIG. 2. In an example shown in FIG. 2, an alternating current flowing into the rectifier circuit 2 from the alternating-current power supply 1 is represented by I0, a full-wave rectified current rectified by the rectifier circuit 2 is represented by I1, an electric current flowing to the inductor 5a is represented by I11, and an electric current flowing to the inductor 5b is represented by I12.

In this case, as shown in FIG. 3, the control circuit 4 outputs a PWM signal SG11 to the switching element 6a and outputs a PWM signal SG12 to the switching element 6b such that the electric current I11 flowing to the inductor 5a and the electric current I12 flowing to the inductor 5b have a phase difference of 180° relative to each other. Consequently, a so-called interleave operation is performed in which each of the switching element 6a and the switching element 6b is turned on at every 180°. Therefore, the alternating current I0 flowing into the rectifier circuit 2 from the alternating-current power supply 1 is formed in a sine wave shape while the peaks of the electric current I11 flowing to the inductor 5a and the electric current I12 flowing to the inductor 5b have a phase difference of 180° relative to each other and thus the power supply power factor is improved.

In this case, a counter electromotive force is generated by switching the electric currents I11 and I12 flowing to the inductors 5a and 5b with the switching elements 6a and 6b. Therefore, it is possible to boost the load voltage V2 with respect to a rectified voltage V1. Note that the control circuit 4 includes a function of changing the carrier frequencies of the PWM signals SG11 and SG12 to thereby adjust the load voltage V2 to fall within a range of a target load voltage set in advance.

Figure 5:
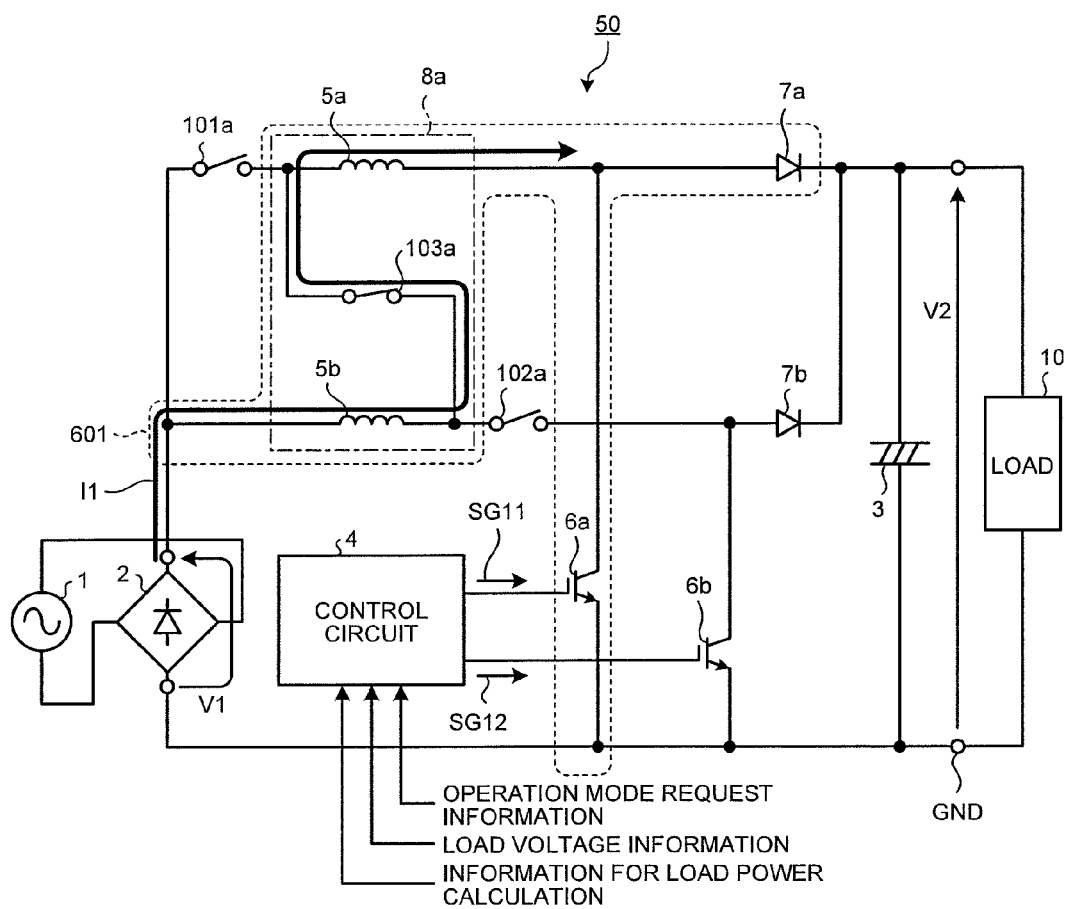
FIG. 5 is a diagram of the configuration of a second switching converter circuit during a low-load operation mode of the interleaved converter according to the first embodiment.
Figure 6:
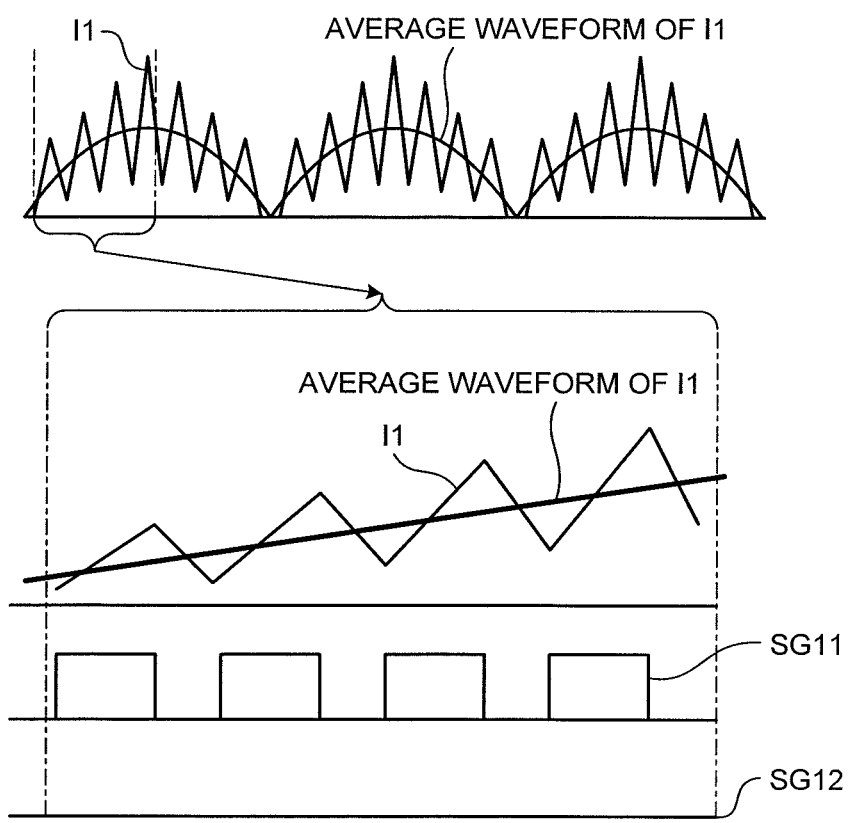
FIG. 6 is a diagram of current waveforms and PWM signal waveforms for causing the switching elements to operate during the low-load operation mode of the interleaved converter according to the first embodiment.
Figure 7:
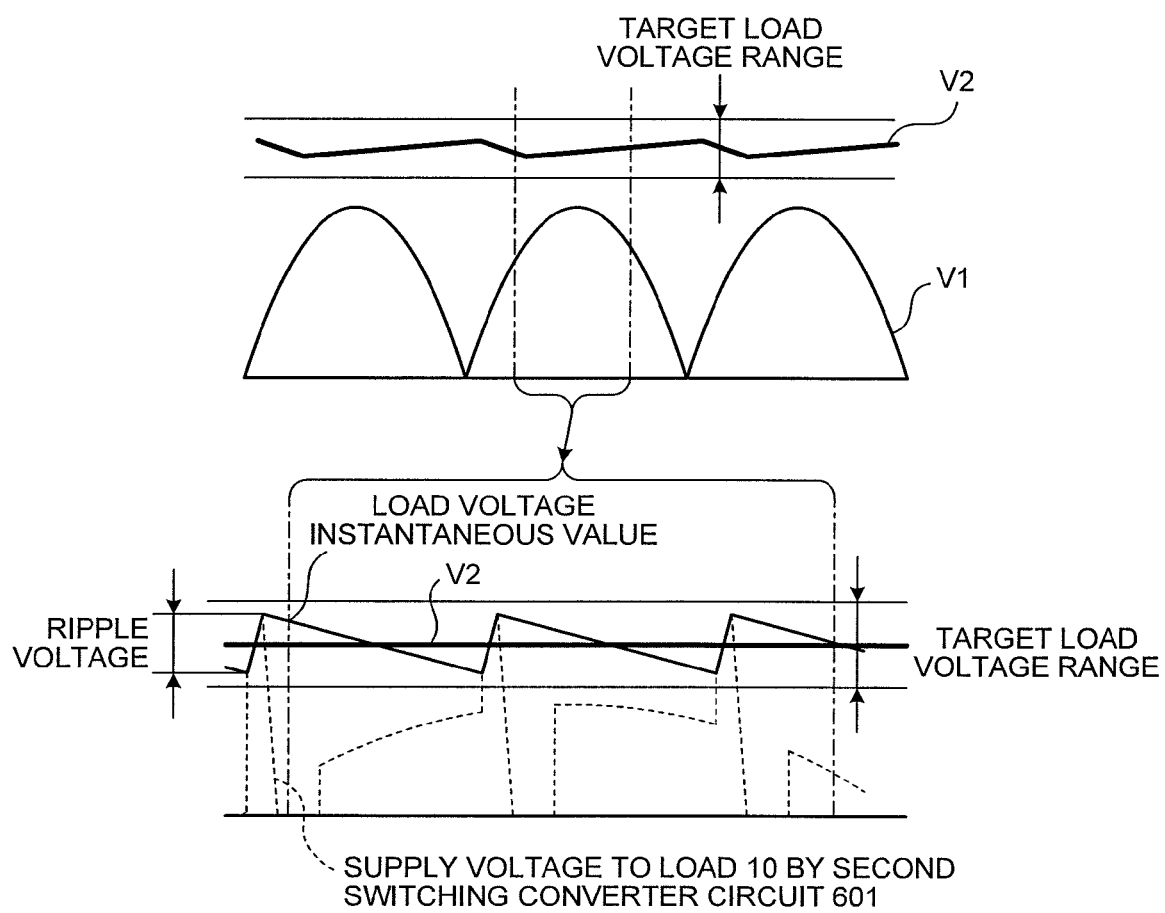
FIG. 7 is a diagram of a full-wave rectified voltage waveform, a load voltage waveform, and a supply voltage waveform to the load during the low-load operation mode of the interleaved converter according to the first embodiment.

An operation during the low-load operation mode in the interleaved converter 50 according to the first embodiment is explained with reference to FIG. 5 to FIG. 7. FIG. 5 is a diagram of the configuration of a second switching converter circuit during the low-load operation mode of the interleaved converter according to the first embodiment. FIG. 6 is a diagram of current waveforms and PWM signal waveforms for causing the switching elements to operate during the low-load operation mode of the interleaved converter according to the first embodiment. FIG. 7 is a diagram of a full-wave rectified voltage waveform, a load voltage waveform, and a supply voltage waveform to a load during the low-load operation mode of the interleaved converter according to the first embodiment.

During the low load operation mode, as shown in FIG. 5, the control circuit 4 subjects the input side switch 101a and the output side switch 102a to OFF control and subjects the inter-inductor switch 103a to ON control. That is, during the low-load operation mode, as shown in FIG. 5, a series inductor circuit 8a is configured by connecting the inductor 5a and the inductor 5b in series, a second switching converter circuit 601 is configured by the series inductor circuit 8a, the switching element 6a, and the diode 7a, and the electric current I1 flows through the path shown in FIG. 5.

In this case, as shown in FIG. 6, the control circuit 4 outputs the PWM signal SG11 to the switching element 6a to cause the switching element 6a to perform an ON/OFF operation. The control circuit 4 stops the output of the PWM signal SG12 to the switching element 6b to disable the switching element 6b. Consequently, it is possible to attain a reduction in the switching loss while effectively utilizing the inductors 5a and 5b. The control circuit 4 includes a function of changing the carrier frequency of the PWM signal SG11 to thereby adjust the load voltage V2 to fall within the range of the target load voltage set in advance as in the high-load operation mode. The control circuit 4 includes a function of causing the pulse width of the PWM signal SG11 variable to thereby change the DUTY ratio of the PWM signal SG11. Consequently, it is possible to bring the alternating current I0 flowing into the rectifier circuit 2 from the alternating-current power supply 1 close to a sine wave and improve the power supply power factor.

As explained above, in this embodiment, in the high-load operation mode, power supply to the load 10 is performed by a so-called interleave operation by the two first switching converter circuits 501 and 502. In the low-load operation mode, power supply to the load 10 is performed by connecting the inductors 5a and 5b in series to configure the series inductor circuit 8a and configuring the second switching converter circuit 601 and causing the second switching converter circuit 601 to operate. Consequently, in the low-load operation mode, the switching element 6b can be disabled. Therefore, it is possible to attain a reduction in the switching loss while effectively utilizing the inductors 5a and 5b and perform appropriate power supply while further reducing the switching loss than in the high-load operation mode. An inductance value of a current path is increased by connecting the two inductors 5a and 5b in series. Therefore, it is possible to improve the boosting ability. Further, it is possible to reduce the carrier frequency of the PWM signal SG11 without reducing the load voltage V2. Therefore, it is possible to realize a further reduction in the switching loss.

Switching control for the high-load operation mode and the low-load operation mode in the interleaved converter according to the first embodiment is explained.

Figure 8:
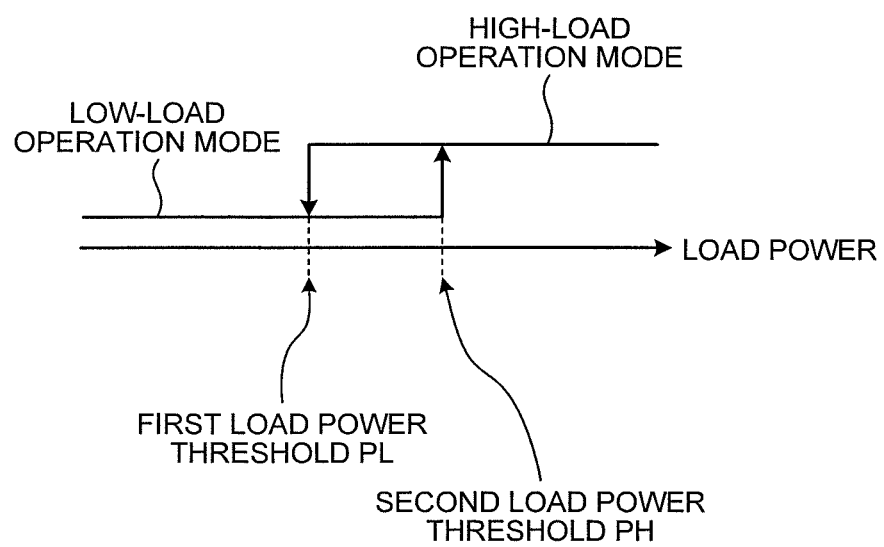
FIG. 8 is a diagram for explaining operation mode switching conditions corresponding to the magnitude of the load power in the interleaved converter according to the first embodiment.

In this embodiment, as explained above, the switching of the operation mode is carried out according to the magnitude of the load power or the operation mode request information. First, operation mode switching conditions corresponding to the magnitude of the load power are explained with reference to FIG. 8. FIG. 8 is a diagram explaining the operation mode switching conditions corresponding to the magnitude of the load power in the interleaved converter according to the first embodiment.

As explained above, the control circuit 4 calculates the load power using the information for load power calculation including the instantaneous values of the load voltage applied to the load 10 and the load current flowing into the load 10 or the instantaneous values of the input voltage and the input current input from the alternating-current power supply 1. The control circuit 4 compares the calculated load voltage with a first load power threshold PL and a second load power threshold PH shown in FIG. 8 to thereby determine whether the switching of the operation mode is performed (hereinafter referred to as "operation mode switching determination").

As shown in FIG. 8, during the high-load operation mode, when the load power falls below the first load power threshold PL set in advance, the operation mode shifts to the low-load operation mode. On the other hand, during the low-load operation mode, when the load power exceeds the second load power threshold PH set in advance, the operation mode shifts to the high-load operation mode. When the load power does not meet both the conditions, the operation mode is not changed. In this embodiment, the first load power threshold PL for shifting the operation mode from the high-load operation mode to the low-load operation mode is set to a value lower than the second load power threshold PH for shifting the operation mode from the low-load operation mode to the high-load operation mode (PL<PH). By setting the first load power threshold PL and the second load power threshold PH in this way, it is possible to prevent the high-load operation mode and the low-load operation mode from being frequently switched. It is possible to perform stable switching control for the operation mode.

Figure 9:
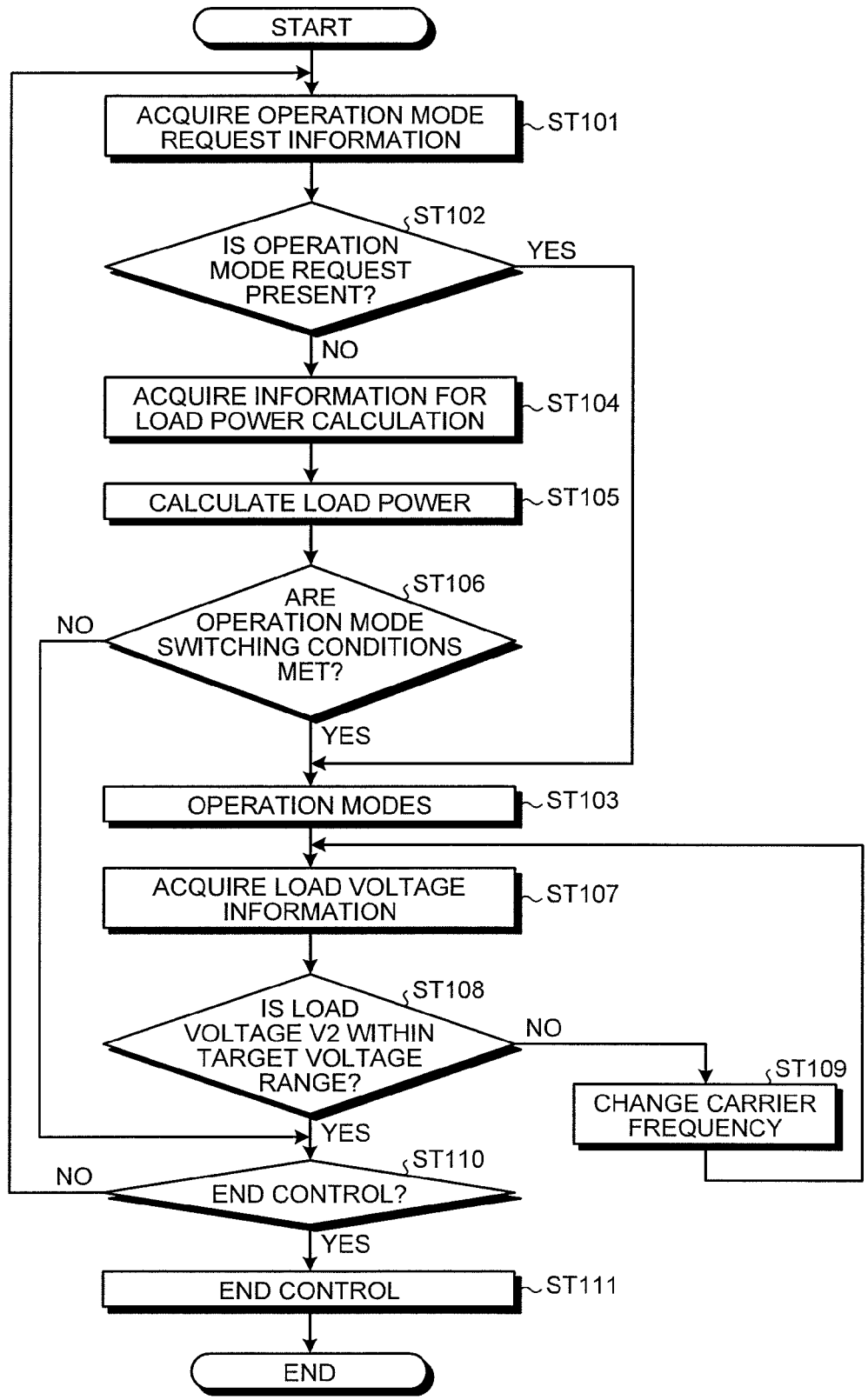
FIG. 9 is a flowchart explaining an example of operation mode switching control in the interleaved converter according to the first embodiment.

Operation mode switching control in the interleaved converter 50 according to the first embodiment is explained with reference to FIG. 9. FIG. 9 is a flowchart explaining an example of the operation mode switching control in the interleaved converter according to the first embodiment.

At the start of control of the interleaved converter 50, the control circuit 4 acquires operation mode request information (step ST101) and determines the presence or absence of an operation mode request (step ST102).

When the operation mode request is present (Yes at step ST102), that is, when the operation mode is changed from the present operation mode, the control circuit 4 shifts to the requested operation mode (step ST103), controls the input side switch 101*a*, the output side switch 102*a*, and the inter-inductor switch 103*a*, and performs switching control in the operation modes.

That is, when shifting the operation mode from the high-load operation mode to the low-load operation mode, the control circuit 4 controls the input side switch 101*a* and the output side switch 102*a* to switch from ON to OFF and controls the inter-inductor switch 103*a* to switch from OFF to ON to configure the second switching converter circuit 601, outputs the PWM signal SG11 to the switching element 6*a* to cause the switching element 6*a* to perform an ON/OFF operation, and stops the output of the PWM signal SG12 to the switching element 6*b* to disable the switching element 6*b*.

When shifting the operation mode from the low-load operation mode to the high-load operation mode, the control circuit 4 controls the input side switch 101*a* and the output side switch 102*a* to switch from OFF to ON and controls the inter-inductor switch 103*a* to switch from ON to OFF to configure the first switching converter circuits 501 and 502, outputs the PWM signal SG11 to the switching element 6*a*, and outputs the PWM signal SG12 to the switching element 6*b*.

When the operation mode request is absent (No at step ST102), that is, when the operation mode is not changed from the present operation mode, the control circuit 4 acquires the information for load power calculation (step ST104) and calculates the load power (step ST105). Then, the control circuit 4 carries out the operation mode switching determination described above and determines whether the operation mode switching conditions shown in FIG. 8 are met (step ST106).

When the operation mode switching conditions are not met (No at step ST106), the control circuit 4 determines whether the operation mode switching control is to be ended (step ST110). When the operation mode switching control is to be ended (Yes at step ST110), the control circuit 4 ends the operation mode switching control (step ST111). When the operation mode switching control is not to be ended (No at step ST110), the control circuit 4 returns to the processing at step ST101 and repeatedly carries out the processing at step ST101 to step ST110. Note that the present invention is not limited by this operation mode switching control end determining method at step ST110.

When the operation mode switching conditions are met (Yes at step ST106), the control circuit 4 shifts the operation mode to the requested operation mode (step ST103).

After the shift of the operation mode (step ST103), the control circuit 4 acquires the load voltage information (step ST107) and determines whether the load voltage V2 is within a target load voltage range set in advance (step ST108).

When the load voltage V2 is outside the target load voltage range (No at step ST108), the control circuit 4 changes the carrier frequencies of the PWM signals SG11 and SG12 (step ST109), returns to the processing at step ST107, and repeatedly carries out the processing at step ST107 and step ST108 until the load voltage V2 falls within the target load voltage range (Yes at step ST108).

When the load voltage V2 is within the target load voltage range (Yes at step ST108), the control circuit 4 determines whether the operation mode switching control is to be ended (step ST110). When the operation mode switching control is to be ended (Yes at step ST110), the control circuit 4 ends the operation mode switching control (step ST111). When the operation mode switching control is not to be ended (No at step ST110), the control circuit 4 returns to the processing at step ST101 and repeatedly carries out the processing at step ST101 to step ST110.

As explained above, with the interleaved converter according to the first embodiment, as the operation mode, the high-load operation mode in which the load power is large and the low-load operation mode in which the load power is smaller than the load power in the high-load operation mode are provided. In the high-load operation mode, two first switching converter circuits are each configured by one inductor, one switching element, and one diode. These two first switching converter circuits are caused to perform an interleave operation to perform power supply to the load. In the low-load operation mode, two inductors are connected in series to configure one series inductor circuit. One second switching converter circuit is configured by this series inductor circuit, one switching element, and one diode. This second switching converter circuit is caused to operate to perform power supply to the load. Therefore, it is possible to effectively utilize the inductors even in the low-power load.

In the low-load operation mode, one switching element not configuring the second switching converter circuit can be disabled. Therefore, it is possible to perform appropriate power supply while further reducing the switching loss than in the high-load operation mode.

The inductance value of the current path is increased by connecting two inductors in series. Therefore, it is possible to improve the boosting ability. It is possible to reduce the carrier frequency of the PWM signal for causing the switching element configuring the second switching converter circuit to operate without reducing the load voltage. Therefore, it is possible to further reduce the switching loss.

Therefore, it is possible to further improve converter efficiency in the low-power load and obtain an interleaved converter that enables a more highly efficient operation.

As the conditions for switching the operation mode, the first load power threshold PL for shifting the operation mode from the high-load operation mode to the low-load operation mode is set to the value lower than the second load power threshold PH for shifting the operation mode from the low-load operation mode to the high-load operation mode (PL<PH). Therefore, it is possible to prevent the high-load operation mode and the low-load operation mode from being frequently switched and perform stable switching control for the operation mode.

The user can also select the operation mode. Therefore, it is possible to perform a more flexible operation. For example, the user can intentionally reduce the load power and operate the interleaved converter.

Second Embodiment

In the example explained in the first embodiment, the interleaved converter is configured by two switching converter circuits connected in parallel. In the present embodiment, an example is explained in which an interleaved converter is configured by three switching converter circuits connected in parallel.

Figure 10:
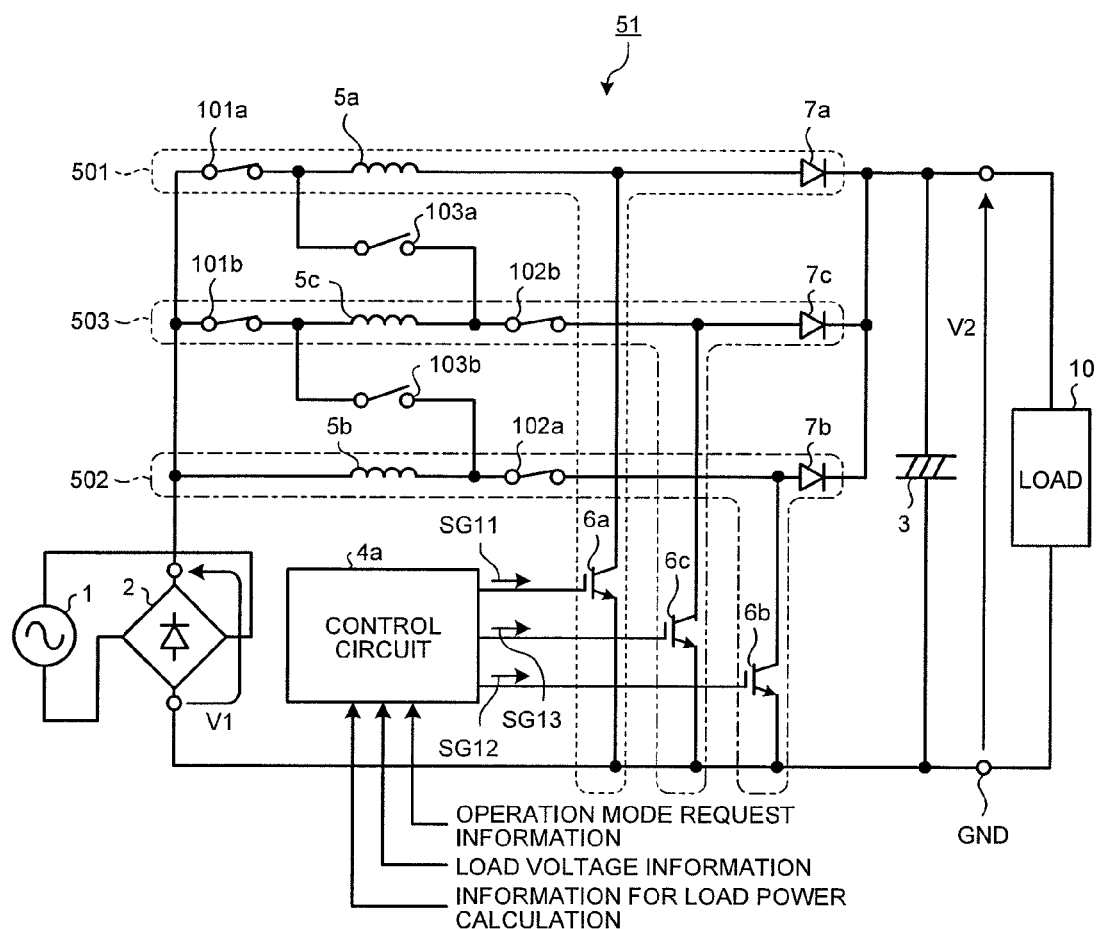
FIG. 10 is a diagram of a configuration example of an interleaved converter according to a second embodiment.

FIG. 10 is a diagram showing a configuration example of an interleaved converter according to the second embodiment. Note that components same as or equivalent to the components in the first embodiment are denoted by the same reference numerals and signs and detailed explanation of the components is omitted.

As shown in FIG. 10, in an interleaved converter 51 according to the second embodiment, the interleaved converter 50 according to the first embodiment is configured as a three-circuit parallel interleaved converter. In addition to the configuration explained in the first embodiment, the interleaved converter 51 includes a first switching converter circuit 503 configured to include an inductor 5*c*, a switching element 6*c*, and a diode 7*c*. In the first switching converter circuit 503, the high-voltage side output terminal of the rectifier circuit 2 and one end of the inductor 5c are connected via an input side switch 101b, the other end of the inductor 5c and the anode of the diode 7c are connected via an output side switch 102b, and the switching element 6c is connected between the connection point of the other end of the inductor 5c and the anode of the diode 7c and the GND.

The connection point of the input side switch 101a and the inductor 5a and the connection point of the inductor 5c and the output side switch 102b are connected via the inter-inductor switch 103a. The connection point of the input side switch 101b and the inductor 5c and the connection point of the inductor 5b and the output side switch 102a are connected via an inter-inductor switch 103b.

A control circuit 4a includes a function of subjecting the switching elements 6a, 6b, and 6c to switching control and controlling the input side switches 101a and 101b, the output side switches 102a and 102b, and the inter-inductor switches 103a and 103b according to operation mode request information, load voltage information, and information for load power calculation received from the outside.

Figure 11:
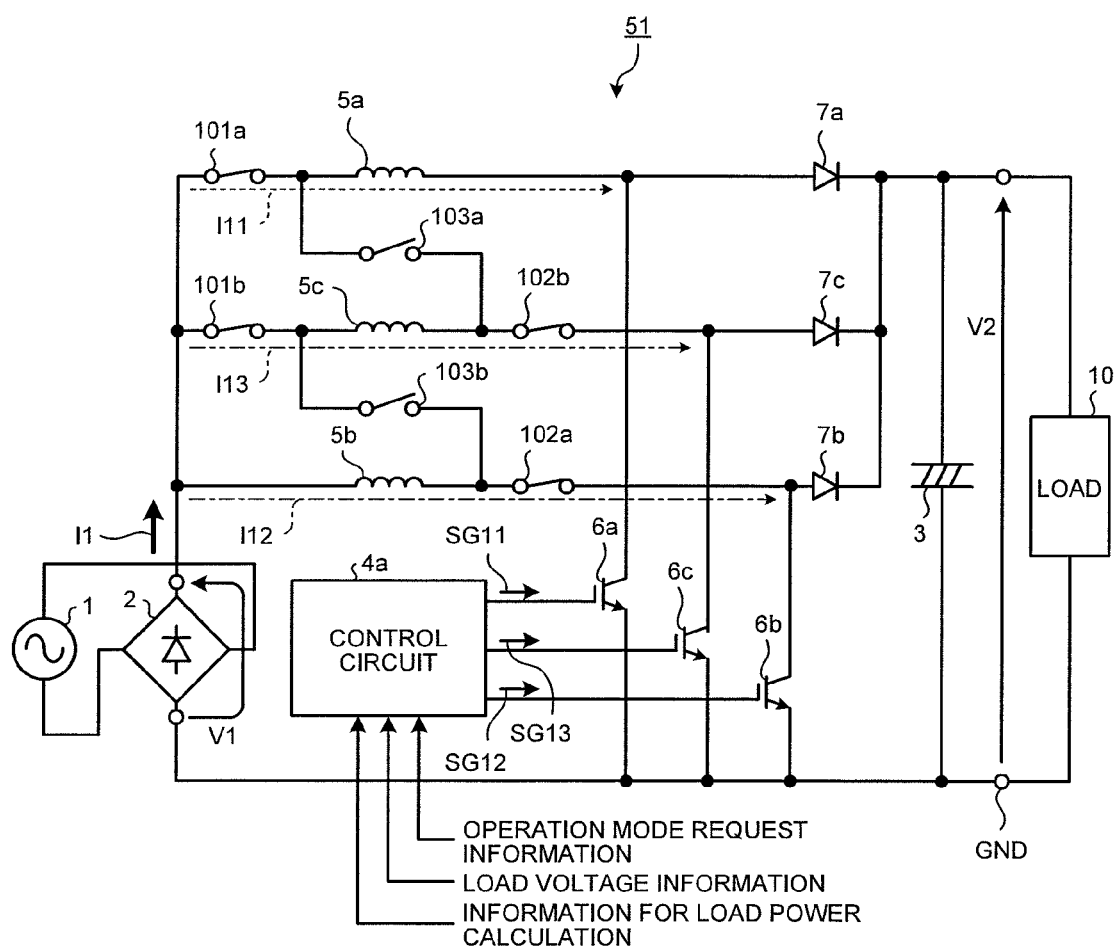
FIG. 11 is a diagram of the configuration of first switching converter circuits during a high-load operation mode of the interleaved converter according to the second embodiment.

Operations during respective operation modes in the interleaved converter 51 according to the second embodiment are explained. First, an operation during the high-load operation mode is explained with reference to FIG. 11. FIG. 11 is a diagram of the configuration of the first switching converter circuits during the high-load operation mode of the interleaved converter according to the second embodiment.

During the high-load operation mode, as shown in FIG. 11, the control circuit 4a subjects the input side switches 101a and 101b and the output side switches 102a and 102b to ON control and subjects the inter-inductor switches 103a and 103b to OFF control. That is, during the high-load operation mode, as shown in FIG. 11, the first switching converter circuit 501 is configured by the inductor 5a, the switching element 6a, and the diode 7a, the first switching converter circuit 502 is configured by the inductor 5b, the switching element 6b, and the diode 7b, the first switching converter circuit 503 is configured by the inductor 5c, the switching element 6c, and the diode 7c, and electric currents flow through the paths shown in FIG. 11. In an example shown in FIG. 11, an alternating current flowing into the rectifier circuit 2 from the alternating-current power supply 1 is represented by I0, a full-wave rectified current rectified by the rectifier circuit 2 is represented by I1, an electric current flowing to the inductor 5a is represented by I11, an electric current flowing to the inductor 5b is represented by I12, and an electric current flowing to the inductor 5c is represented by I13.

In this case, the control circuit 4a outputs the PWM signal SG11 to the switching element 6a, outputs the PWM signal SG12 to the switching element 6b, and outputs a PWM signal SG13 to the switching element 6c such that the electric current I11 flowing to the inductor 5a, the electric current I12 flowing to the inductor 5b, and the electric current I13 flowing to the inductor 5c have a phase difference of 120° relative to each other. Consequently, a so-called interleave operation is performed in which each of the switching element 6a, the switching element 6b, and the switching element 6c is turned on at every 120°. Therefore, the alternating current I0 flowing into the rectifier circuit 2 from the alternating-current power supply 1 is formed in a sine wave shape while the peaks of the electric current I11 flowing to the inductor 5a, the electric current I12 flowing to the inductor 5b, and the electric current I13 flowing to the inductor 5c have a phase difference of 120° relative to each other and thus the power supply power factor is improved.

In this case, a counter electromotive force is generated by switching the electric currents I11, I12, and I13 flowing to the inductors 5a, 5b, and 5c with the switching elements 6a, 6b, and 6c. Therefore, it is possible to boost the load voltage V2 with respect to the rectified voltage V1. Note that the control circuit 4a includes a function of changing the carrier frequencies of the PWM signals SG11, SG12, and SG13 to thereby adjust the load voltage V2 to fall within a range of a target load voltage set in advance.

Figure 12:
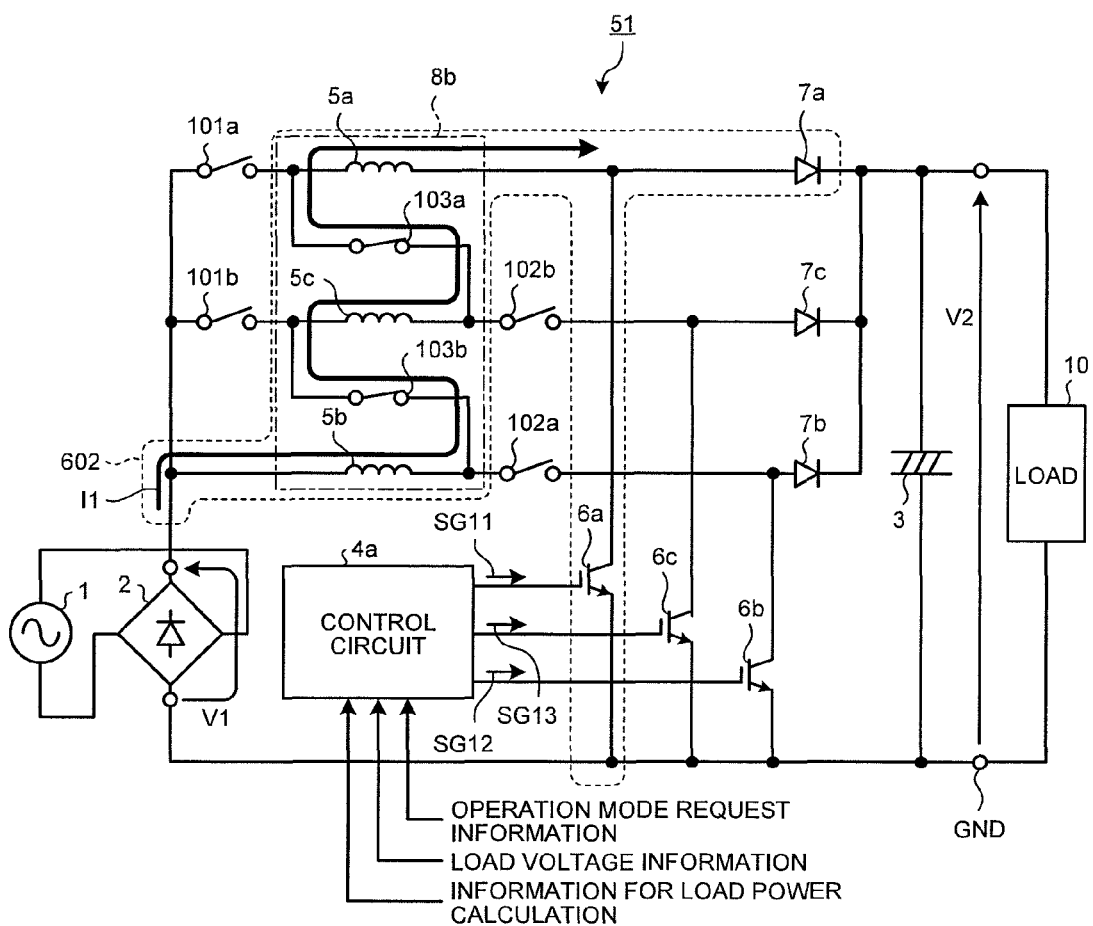
FIG. 12 is a diagram of the configuration of a second switching converter circuit during a low-load operation mode of the interleaved converter according to the second embodiment.

An operation during the low-load operation mode in the interleaved converter 51 according to the second embodiment is explained with reference to FIG. 12. FIG. 12 is a diagram of the configuration of a second switching converter circuit during the low-load operation mode of the interleaved converter according to the second embodiment.

During the low-load operation mode, as shown in FIG. 12, the control circuit 4a subjects the input side switches 101a and 101b and the output side switches 102a and 102b to OFF control and subjects the inter-inductor switches 103a and 103b to ON control. That is, during the low-load operation mode, as shown in FIG. 12, a series inductor circuit 8b is configured by connecting the inductor 5a, the inductor 5b, and the inductor 5c in series, a second switching converter circuit 602 is configured by the series inductor circuit 8b, the switching element 6a, and the diode 7a, and the electric current I1 flows through the path shown in FIG. 12.

In this case, the control circuit 4a outputs the PWM signal SG11 to the switching element 6a to cause the switching element 6a to perform an ON/OFF operation. The control circuit 4a stops the output of the PWM signals SG12 and SG13 to the switching elements 6b and 6c to disable the switching elements 6b and 6c. Consequently, it is possible to attain a reduction in the switching loss while effectively utilizing the inductors 5a, 5b, and 5c. The control circuit 4a includes a function of changing the carrier frequency of the PWM signal SG11 to thereby adjust the load voltage V2 to fall within the range of the target load voltage set in advance as in the high-load operation mode. The control circuit 4a includes a function of causing the pulse width of the PWM signal SG11 variable to thereby change the DUTY ratio of the PWM signal SG11. Consequently, it is possible to bring the alternating current I0 flowing into the rectifier circuit 2 from the alternating-current power supply 1 close to a sine wave and improve the power supply power factor.

As explained above, in this embodiment, in the high-load operation mode, power supply to the load 10 is performed by a so-called interleave operation by the three first switching converter circuits 501, 502, and 503. In the low-load operation mode, power supply to the load 10 is performed by connecting the inductors 5a, 5b, and 5c in series to configure the series inductor circuit 8b and configuring the second switching converter circuit 602 and causing the second switching converter circuit 602 to operate. Consequently, in the low-load operation mode, the switching elements 6b and 6c can be disabled. Therefore, it is possible to attain a reduction in the switching loss while effectively utilizing the inductors 5a, 5b, and 5c and perform appropriate power supply while further reducing the switching loss than in the high-load operation mode. An inductance value of a current path is increased by connecting the three inductors 5a, 5b, and 5c in series. Therefore, it is possible to improve the boosting ability. Further, it is possible to reduce the carrier frequency of the PWM signal SG11 without reducing the load voltage V2. Therefore, it is possible to realize a further reduction in the switching loss.

Note that switching control for the high-load operation mode and the low-load operation mode in the interleaved converter according to the second embodiment is the same as the switching control in the first embodiment. Therefore, explanation of the switching control is omitted.

As explained above, with the interleaved converter in the second embodiment, it is possible to obtain effects same as the effects in the first embodiment even when the interleaved converter is configured as the three-circuit parallel interleaved converter by three switching converter circuits connected in parallel.

Third Embodiment

In the examples explained in the first embodiment and the second embodiment, the interleaved converter is configured by two or three switching converter circuits connected in parallel. In the present embodiment, an example is explained in which an interleaved converter is configured by four or more switching converter circuits connected in parallel.

Figure 13:
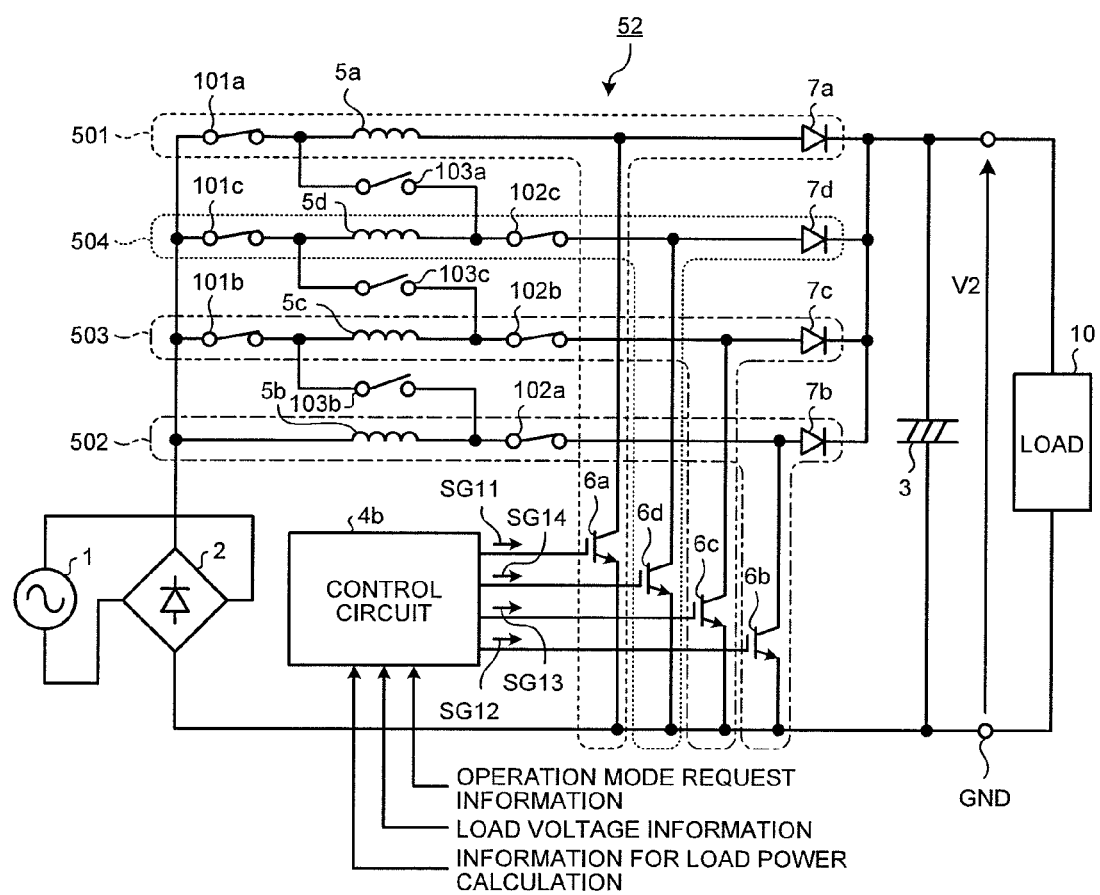
FIG. 13 is a diagram of a configuration example of an interleaved converter according to a third embodiment.

FIG. 13 is a diagram showing a configuration example of an interleaved converter according to the third embodiment. Note that components same as or equivalent to the components in the first embodiment or the second embodiment are denoted by the same reference numerals and signs and detailed explanation of the components is omitted. In the example shown in FIG. 13, a case where the number of first switching converter circuits is four is illustrated.

In the example shown in FIG. 13, an interleaved converter 52 according to the third embodiment is configured as a four-circuit parallel interleaved converter. In addition to the configuration explained in the second embodiment, the interleaved converter 52 includes a first switching converter circuit 504 configured to include an inductor 5d, a switching element 6d, and a diode 7d. In the first switching converter circuit 504, the high-voltage side output terminal of the rectifier circuit 2 and one end of the inductor 5d are connected via an input side switch 101c, the other end of the inductor 5d and the anode of the diode 7d are connected via an output side switch 102c, and the switching element 6d is connected between the connection point of the other end of the inductor 5d and the anode of the diode 7d and the GND.

The connection point of the input side switch 101a and the inductor 5a and the connection point of the inductor 5d and the output side switch 102c are connected via the inter-inductor switch 103a. The connection point of the input side switch 101c and the inductor 5d and the connection point of the inductor 5c and the output side switch 102b are connected via the inter-inductor switch 103c. The connection point of the input side switch 101b and the inductor 5c and the connection point of the inductor 5b and the output side switch 102a are connected via the inter-inductor switch 103b.

A control circuit 4b includes a function of subjecting the switching elements 6a, 6b, 6c, and 6d to switching control and controlling the input side switches 101a, 101b, and 101c, the output side switches 102a, 102b, and 102c, and the inter-inductor switches 103a, 103b, and 103c according to operation mode request information, load voltage information, and information for load power calculation received from the outside.

Figure 14:
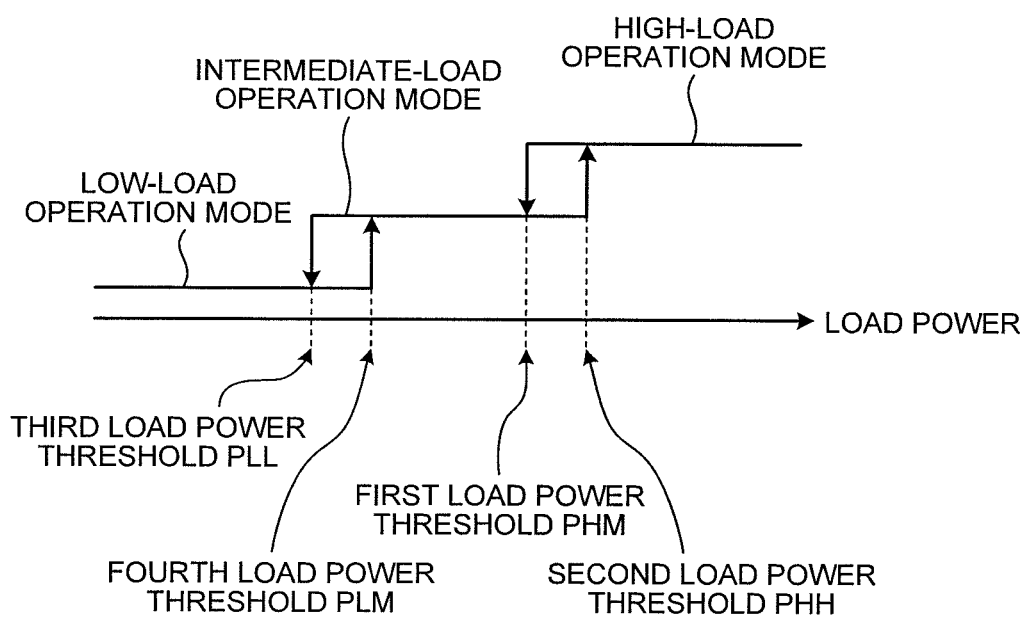
FIG. 14 is a diagram explaining operation mode switching conditions corresponding to the magnitude of the load power in the interleaved converter according to the third embodiment.

FIG. 14 is a diagram explaining operation mode switching conditions corresponding to the magnitude of the load power in the interleaved converter according to the third embodiment. In this embodiment, in addition to the high-load operation mode and the low-load operation mode explained in the first embodiment, the operation mode includes an intermediate-load operation mode in which the load power range is lower than a load power range in the high-load operation mode and higher than a load power range in the low-load operation mode.

As shown in FIG. 14, during the high-load operation mode, when the load power falls below a first load power threshold PHM set in advance, the operation mode shifts to the intermediate-load operation mode. On the other hand, during the intermediate-load operation mode, when the load power exceeds a second load power threshold PHH set in advance, the operation mode shifts to the high-load operation mode. During the intermediate-load operation mode, when the load power falls below a third load power threshold PLL set in advance, the operation mode shifts to the low-load operation mode. On the other hand, during the low-load operation mode, when the load power exceeds a fourth load power threshold PLM set in advance, the operation mode shifts to the intermediate-load operation mode. When the load power does not meet all the conditions, the operation mode is not changed.

In this embodiment, the first load power threshold PHM for shifting the operation mode from the high-load operation mode to the intermediate-load operation mode is set to a value lower than the second load power threshold PHH for shifting the operation mode from the intermediate-load operation mode to the high-load operation mode (PHM<PHH). The third load power threshold PLL for shifting the operation mode from the intermediate-load operation mode to the low-load operation mode is set to a value lower than the fourth load power threshold PLM for shifting the operation mode from the low-load operation mode to the intermediate-load operation mode (PLL<PLM).

By setting the first load power threshold PHM, the second load power threshold PHH, the third load power threshold PLL, and the fourth load power threshold PLM in this way, it is possible to prevent the operation modes adjacent to each other (i.e., the high-load operation mode and the intermediate-load operation mode and the intermediate-load operation mode and the low-load operation mode) from being frequently switched. It is possible to perform stable switching of the operation mode.

Operations during the respective operation modes in the interleaved converter 52 according to the third embodiment are explained. First, an operation during the high-load operation mode is explained with reference to FIG. 13.

During the high-load operation mode, as shown in FIG. 13, the control circuit 4b subjects the input side switches 101a, 101b, and 101c and the output side switches 102a, 102b, and 102c to ON control and subjects the inter-inductor switches 103a, 103b, and 103c to OFF control. That is, during the high-load operation mode, as shown in FIG. 13, the first switching converter circuit 501 is configured by the inductor 5a, the switching element 6a, and the diode 7a, the first switching converter circuit 502 is configured by the inductor 5b, the switching element 6b, and the diode 7b, the first switching converter circuit 503 is configured by the inductor 5c, the switching element 6c, and the diode 7c, and the first switching converter circuit 504 is configured by the inductor 5d, the switching element 6d, and the diode 7d.

In this case, the control circuit 4b outputs the PWM signal SG11 to the switching element 6a, outputs the PWM signal SG12 to the switching element 6b, outputs the PWM signal SG13 to the switching element 6c, and outputs a PWM signal SG14 to the switching element 6d such that the electric currents flowing to the inductors 5a, 5b, 5c, and 5d have a phase difference of 90° relative to each other. Consequently, a so-called interleave operation is performed in which each of the switching element 6a, the switching element 6b, the switching element 6c, and the switching element 6d is turned on at every 90°. Therefore, the alternating current flowing into the rectifier circuit 2 from the alternating-current power supply 1 is formed in a sine wave shape while the peaks of the electric currents flowing to the inductors 5a, 5b, 5c, and 5d have a phase difference of 90° relative to each other and thus the power supply power factor is improved.

In this case, a counter electromotive force is generated by switching the inductors 5a, 5b, 5c, and 5d with the switching elements 6a, 6b, 6c, and 6d. Therefore, it is possible to boost the load voltage V2 with respect to the rectified voltage V1. Note that the control circuit 4b includes a function of changing the carrier frequencies of the PWM signals SG11, SG12, SG13, and SG14 to thereby adjust the load voltage V2 to fall within a range of a target load voltage set in advance.

Figure 15:
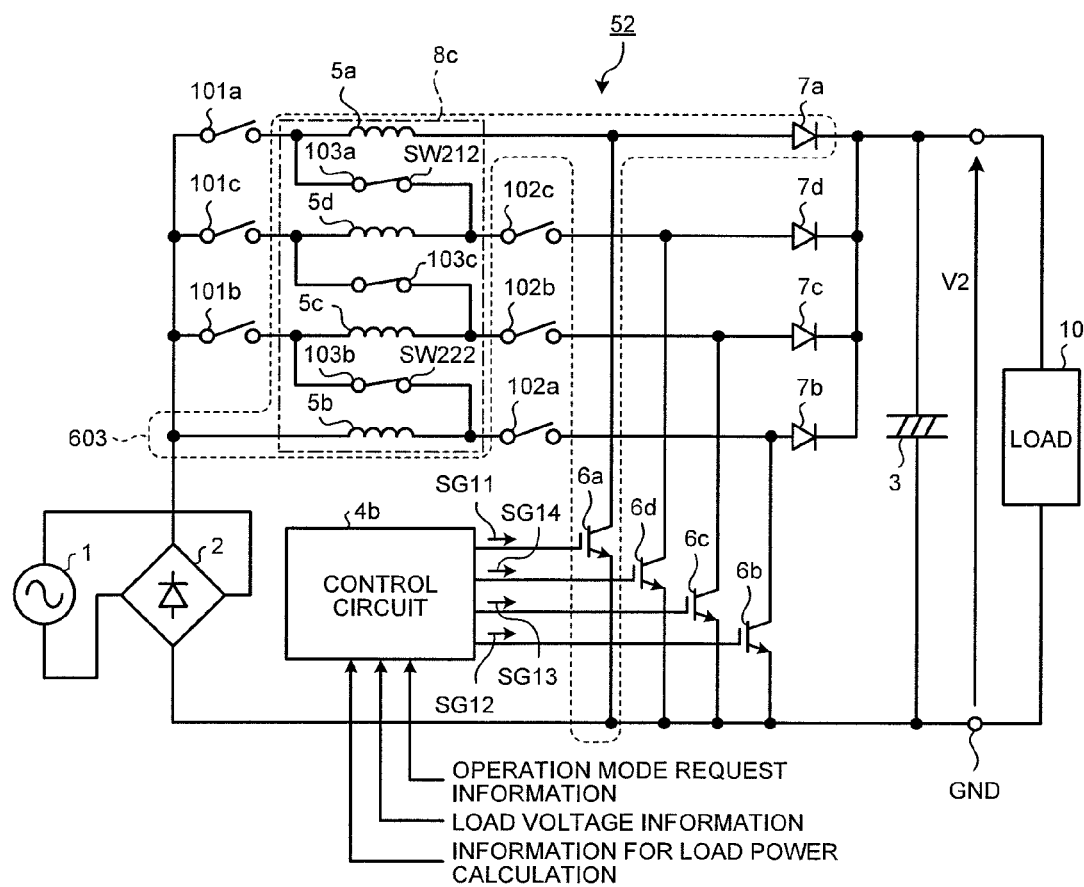
FIG. 15 is a diagram of the configuration of a second switching converter circuit during a low-load operation mode of the interleaved converter according to the third embodiment.

An operation during the low-load operation mode in the interleaved converter 52 according to the third embodiment is explained with reference to FIG. 15. FIG. 15 is a diagram of the configuration of a second switching converter circuit during the low-load operation mode of the interleaved converter according to the third embodiment.

During the low-load operation mode, as shown in FIG. 15, the control circuit 4b subjects the input side switches 101a, 101b, and 101c and the output side switches 102a, 102b, and 102c to OFF control and subjects the inter-inductor switches 103a, 103b, and 103c to ON control. That is, during the low-load operation mode, as shown in FIG. 15, a series inductor circuit 8c is configured by connecting the inductor 5a, the inductor 5b, the inductor 5c, and the inductor 5d in series, and a second switching converter circuit 603 is configured by the series inductor circuit 8c, the switching element 6a, and the diode 7a.

In this case, the control circuit 4b outputs the PWM signal SG11 to the switching element 6a to cause the switching element 6a to perform an ON/OFF operation. The control circuit 4b stops the output of the PWM signals SG12, SG13, and SG14 to the switching elements 6b, 6c, and 6d to disable the switching elements 6b, 6c, and 6d. Consequently, it is possible to attain a reduction in the switching loss while effectively utilizing the inductors 5a, 5b, 5c, and 5d. The control circuit 4b includes a function of changing the carrier frequency of the PWM signal SG11 to thereby adjust the load voltage V2 to fall within the range of the target load voltage set in advance as in the high-load operation mode. The control circuit 4b includes a function of causing the pulse width of the PWM signal SG11 variable to thereby change the DUTY ratio of the PWM signal SG11. Consequently, it is possible to bring the alternating current flowing into the rectifier circuit 2 from the alternating-current power supply 1 close to a sine wave and improve the power supply power factor.

Figure 16:
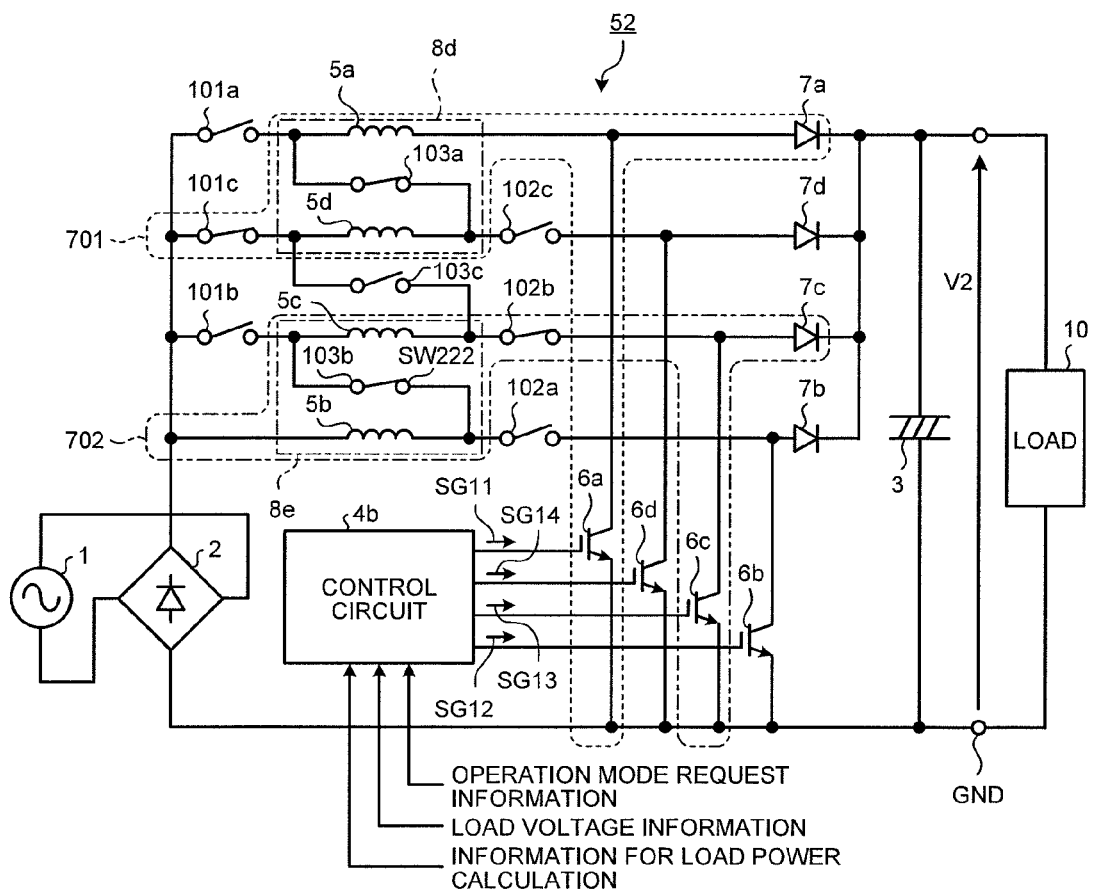
FIG. 16 is a diagram of the configuration of third switching converter circuits during an intermediate-load operation mode of the interleaved converter according to the third embodiment.

An operation during the intermediate-load operation mode in the interleaved converter 52 according to the third embodiment is explained with reference to FIG. 16. FIG. 16 is a diagram of the configuration of third switching converter circuits during the intermediate-load operation mode of the interleaved converter according to the third embodiment.

During the intermediate-load operation mode, as shown in FIG. 16, the control circuit 4b subjects the input side switches 101a and 101b, the output side switches 102a and 102c, and the inter-inductor switch 103c to OFF control and subjects the input side switch 101c, the output side switch 102b, and the inter-inductor switches 103a and 103b to ON control. That is, during the intermediate-load operation mode, as shown in FIG. 16, a series inductor circuit 8d is configured by connecting the inductor 5a and the inductor 5d in series and a third switching converter circuit 701 is configured by the series inductor circuit 8d, the switching element 6a, and the diode 7a. Moreover, a series inductor circuit 8e is configured by connecting the inductor 5b and the inductor 5c in series and a third switching converter circuit 702 is configured by the series inductor circuit 8e, the switching element 6c, and the diode 7c.

In this case, the control circuit 4b outputs the PWM signal SG11 to the switching element 6a to cause the switching element 6a to perform an ON/OFF operation and outputs the PWM signal SG13 to the switching element 6c to cause the switching element 6c to perform an ON/OFF operation. The control circuit 4b stops the output of the PWM signals SG12 and SG14 to the switching elements 6b and 6d to disable the switching elements 6b and 6d. Consequently, during the intermediate-load operation mode also, it is possible to attain a reduction in the switching loss while effectively utilizing the inductors 5a, 5b, 5c, and 5d. The control circuit 4b outputs the PWM signal SG11 to the switching element 6a and outputs the PWM signal SG13 to the switching element 6c such that the electric current flowing to the series inductor circuit 8d and the electric current flowing to the series inductor circuit 8e have a phase difference of 180° relative to each other. Consequently, a so-called interleave operation is performed in which each of the switching element 6a and the switching element 6c is turned on at every 180°. Therefore, the alternating current flowing into the rectifier circuit 2 from the alternating-current power supply 1 is formed in a sine wave shape while the peaks of the electric current flowing to the series inductor circuit 8d and the electric current flowing to the series inductor circuit 8e have a phase difference of 180° relative to each other and thus the power supply power factor is improved.

As explained above, in this embodiment, in the high-load operation mode, power supply to the load 10 is performed by a so-called interleave operation by the four first switching converter circuits 501, 502, 503, and 504. In the low-load operation mode, power supply to the load 10 is performed by connecting the inductors 5a, 5b, 5c, and 5d in series to configure the series inductor circuit 8c and configuring the second switching converter circuit 603 and causing the second switching converter circuit 603 to operate. Consequently, in the low-load operation mode, the switching elements 6b, 6c, and 6d can be disabled. Therefore, it is possible to attain a reduction in the switching loss while effectively utilizing the inductors 5a, 5b, 5c, and 5d and perform appropriate power supply while further reducing the switching loss than in the high-load operation mode. An inductance value of a current path is increased by connecting the four inductors 5a, 5b, 5c, and 5d in series. Therefore, it is possible to improve the boosting ability. Further, it is possible to reduce the carrier frequency of the PWM signal SG11 without reducing the load voltage V2. Therefore, it is possible to realize a further reduction in the switching loss.

Further, in this embodiment, in addition to the high-load operation mode and the low-load operation mode explained in the first embodiment, the operation mode includes the intermediate-load operation mode in which the load power range is lower than the load power range in the high-load operation mode and higher than the load power range in the low-load operation mode. In the intermediate-load operation mode also, the inductors 5a and 5d are connected in series to configure the series inductor circuit 8d, the inductors 5b and 5c are connected in series to configure the series inductor circuit 8e, the two third switching converter circuits 701 and 702 are configured, and power supply to the load 10 is performed by a so-called interleave operation by the two third switching converter circuits 701 and 702. Consequently, in the intermediate-load operation mode, the switching elements 6b and 6d can be disabled. Therefore, it is possible to attain a reduction in the switching loss while effectively utilizing the inductors 5a, 5b, 5c, and 5d. It is possible to perform more appropriate power supply according to the magnitude of the load power.

Note that, in the example explained with reference to FIG. 13 to FIG. 16, the interleaved converter 52 according to the third embodiment is configured as the four-circuit parallel interleaved converter. However, the interleaved converter 52 can also be configured as an n-circuit parallel interleaved converter configured by n (n is an integer equal to or larger than 2) switching converter circuits connected in parallel. Operations during the respective operation modes in this case are explained below.

A control circuit includes a function of subjecting n switching elements to switching control and controlling input side switches, output side switches, and inter-inductor switches for configuring a first switching converter circuit in the high-load operation mode, a second switching converter circuit in the low-load operation mode, and a third switching converter circuit in the intermediate-load operation mode according to operation mode request information, load voltage information, and information for load power calculation received from the outside.

During the high-load operation mode, the control circuit controls the input side switches, the output side switches, and the inter-inductor switches and configures n first switching converter circuits using one inductor, one switching element, and one diode for each of the n first switching converter circuits.

In this case, the control circuit outputs PWM signals respectively to the switching elements such that the electric currents flowing to n inductors have a phase difference of $(360°/n)$ relative to each other. Consequently, a so-called interleave operation is performed in which each of the switching elements is turned on at every $(360°/n)$. Therefore, an alternating current flowing into a rectifier circuit from an alternating-current power supply is formed in a sine wave shape while the peaks of the electric currents flowing to the inductors have a phase difference of $(360°/n)$ relative to each other and thus the power supply power factor is improved.

During the low-load operation mode, the control circuit controls the input side switches, the output side switches, and the inter-inductor switches, connects the n inductors in series to configure one series inductor circuit, and configures one second switching converter circuit using the series conductor circuit, one switching element, and one diode.

In this case, the control circuit outputs a PWM signal to the switching element configuring the second switching converter circuit to cause the switching element to perform an ON/OFF operation and stops the output of PWM signals to the other switching elements to disable the switching elements. Consequently, it is possible to attain a reduction in the switching loss while effectively utilizing the n inductors. The control circuit changes the carrier frequencies of the PWM signals to thereby adjust a load voltage to fall within a range of a target load voltage set in advance. The control circuit causes the pulse width of the PWM signal variable to change the DUTY ratio of the PWM signal to bring the alternating current flowing into the rectifier circuit from the alternating-current power supply close to a sine wave and improve the power supply power factor.

During the intermediate-load operation mode, the control circuit controls the input side switches, the output side switches, and the inter-inductor switches, connects m (m is 1 and divisors of n other than n) inductors in series to configure (n/m) series inductor circuits, and configures (n/m) third switching converter circuits using one of the series inductor circuits, one switching element, and one diode for each of the third switching converter circuits.

In this case, the control circuit outputs PWM signals respectively to the switching elements configuring the (n/m) third switching converter circuits to cause the switching elements to perform an ON/OFF operation and stops the output of PWM signals to the other switching elements to disable the switching elements. Consequently, during the intermediate-load operation mode also, it is possible to attain a reduction in the switching loss while effectively utilizing the n inductors.

The control circuit outputs the PWM signals respectively to the switching elements configuring the (n/m) third switching converter circuits such that the electric currents flowing to the series inductor circuits have a phase difference of $(360°/(n/m))$ relative to each other. Consequently, a so-called interleave operation is performed in which each of the switching elements is turned on at every $(360°/(n/m))$. Therefore, an alternating current flowing into a rectifier circuit from an alternating-current power supply is formed in a sine wave shape while the peaks of the electric currents flowing to the (n/m) series inductor circuits have a phase difference of $(360°/(n/m))$ relative to each other and thus the power supply power factor is improved.

As explained above, with the interleaved converter according to the third embodiment, when the interleaved converter is configured as the n-circuit parallel interleaved converter including n (n is an integer equal to or larger than 2) switching converter circuits connected in parallel, in addition to the high-load operation mode and the low-load operation mode explained in the first embodiment and the second embodiment, the operation mode includes the intermediate-load operation mode in which the load power range is lower than the load power range in the high-load operation mode and higher than the load power range in the low-load operation mode. In the high-load operation mode, n first switching converter circuits are each configured by one inductor, one switching element, and one diode and the n first switching converter circuits are caused to perform the interleave operation to perform power supply to a load. In the low-load operation mode, n inductors are connected in series to configure one series inductor circuit, one second switching converter circuit is configured using the series inductor circuit, one switching element, and one diode, and the second switching converter circuit is caused to operate to perform power supply to the load. In the intermediate-load operation mode, m (m is 1 and divisors of n other than n) inductors are connected in series to configure (n/m) series inductor circuits, (n/m) third switching converter circuits are configured using one of the series inductor circuits, one switching element, and one diode for each of the (n/m) third switching converter circuits, and the (n/m) third switching converter circuits are caused to operate to perform power supply to the load. Therefore, it is possible to effectively utilize the inductors in all the operation modes.

During the intermediate-load operation mode also, (n-(n/m)) switching elements not configuring the (n/m) third switching converter circuits can be disabled. Therefore, it is possible to attain a reduction in the switching loss while effectively utilizing the n inductors.

During the intermediate-load operation mode also, an inductance value of a current path is increased by connecting the m inductors in series. Therefore, it is possible to improve the boosting ability. Further, it is possible to reduce the carrier frequencies of the PWM signals for causing the switching elements configuring the third switching converter circuits to operate without reducing a load voltage. Therefore, it is possible to further reduce the switching loss.

That is, because the operation mode includes the intermediate-load operation mode, it is possible to obtain an interleaved converter that enables a more highly efficient operation. It is possible to perform more appropriate power supply according to the magnitude of the load power.

As conditions for switching the operation mode, the first load power threshold PHM for shifting the operation mode from the high-load operation mode to the intermediate-load operation mode is set to a value lower than the second load power threshold PHH for shifting the operation mode from the intermediate-load operation mode to the high-load operation mode (PHM<PHH). The third load power threshold PLL for shifting the operation mode from the intermediate-load operation mode to the low-load operation mode is set to a value lower than the fourth load power threshold PLM for shifting the operation mode from the low-load operation mode to the intermediate-load operation mode (PLL<PLM). Consequently, it is possible to prevent the operation mode from being frequently switched and perform stable switching control for the operation mode.

As in the first embodiment and the second embodiment, by allowing the user to select the operation mode, it is possible to perform a more flexible operation. For example, the user can intentionally reduce the load power and operate the interleaved converter.

In the examples explained in the embodiment explained above, the operation mode includes one intermediate load operation mode. However, the number of intermediate-load operation modes is not limited to this. The operation mode can include two or more intermediate-load operation modes. In this case, the configuration of the third switching converter circuit is not one either. For example, by providing an intermediate-load operation mode in which (n/m1) third switching converter circuits are configured by connecting m1 inductors in series and a plurality of (two) intermediate-load operation modes in each of which (n/m2) third switching converter circuits are configured by connecting m2 (m2≠m1) inductors in series, it is possible to perform more appropriate power supply corresponding to the magnitude of the load power.

Note that the configurations explained in the embodiments are examples of the configuration of the present invention. It goes without saying that the configurations can be combined with other publicly-known technologies or can be changed by, for example, omitting a part thereof without departing from the spirit of the present invention.

The invention claimed is:

1. An interleaved converter that is configured by connecting in parallel a plurality of switching converter circuits configured by a plurality of inductors, a plurality of switching elements, and a plurality of diodes, that rectify, with a rectifier circuit, an alternating-current voltage supplied from an alternating-current power supply, and that switch, with the switching elements, an output voltage of the rectifier circuit via the inductors to perform one or both of power factor improvement and a boosting operation and to supply electric power to a load, the interleaved converter comprising:

an inter-inductor switch that makes it possible to select whether first and second inductors are connected in series;
an input side switch that is connected to a connection point of the first inductor and the inter-inductor switch and makes it possible to select whether electric power is supplied from the rectifier circuit to a power supply side of the first inductor;
an output side switch that is connected to a connection point of the second inductor and the inter-inductor switch and makes it possible to select whether electric power is supplied from the inductor to a diode side of the second inductor; and a
control circuit that controls the inter-inductor switch, the input side switch, and the output side switch,
wherein the control circuit
includes, as an operation mode of the interleaved converter, a high-load operation mode and a low-load operation mode corresponding to a load power range;
in the high-load operation mode, configures n (n is an integer equal to or larger than 2) first switching converter circuits each with one of the plurality of inductors, one of the plurality of switching elements, and one of the plurality of diodes;
in the low-load operation mode, configures one series inductor circuit by connecting n pieces of the plurality of inductors in series and configures one second switching converter using the series inductor circuit, one of the plurality of switching elements, and one of the plurality of diodes; and
calculates load power on a basis of a load voltage applied to the load and a load current flowing into the load or a voltage of the alternating-current power supply and an input current input from the alternating-current power supply and switches the operation mode according to calculated load power, and
wherein, as a condition for switching the operation mode, the control circuit sets a first load power threshold for shifting the operation mode from the high-load operation mode to the low-load operation mode to a value lower than a second load power threshold for shifting the operation mode from the low-load operation mode to the high-load operation mode.

2. The interleaved converter according to claim 1, wherein, in the high-load operation mode, the control circuit drives n pieces of the switching elements such that electric currents flowing to n pieces of the inductors have a phase difference of (360°/n) relative to each other.

3. The interleaved converter according to claim 1, wherein the control circuit switches the operation mode according to operation mode request information externally input.

4. An interleaved converter that is configured by connecting in parallel a plurality of switching converter circuits configured by a plurality of inductors, a plurality of switching elements, and a plurality of diodes, that rectify, with a rectifier circuit, an alternating-current voltage supplied from an alternating-current power supply, and that switch, with the switching elements, an output voltage of the rectifier circuit via the inductors to perform one or both of power factor improvement and a boosting operation and to supply electric power to a load, the interleaved converter comprising:

an inter-inductor switch that makes it possible to select whether first and second inductors are connected in series;
an input side switch that is connected to a connection point of the first inductor and the inter-inductor switch and makes it possible to select whether electric power is supplied from the rectifier circuit to a power supply side of the first inductor;
an output side switch that is connected to a connection point of the second inductor and the inter-inductor switch and makes it possible to select whether electric power is supplied from the inductor to a diode side of the second inductor; and a
control circuit that controls the inter-inductor switch, the input side switch, and the output side switch, wherein the control circuit
includes, as an operation mode of the interleaved converter, a high-load operation mode and a low-load operation mode corresponding to a load power range;
in the high-load operation mode, configures n (n is an integer equal to or larger than 2) first switching converter circuits each with one of the plurality of inductors, one of the plurality of switching elements, and one of the plurality of diodes; and
in the low-load operation mode, configures one series inductor circuit by connecting n pieces of the plurality of inductors in series and configures one second switching converter using the series inductor circuit, one of the plurality of switching elements, and one of the plurality of diodes,
wherein
the control circuit further includes, as the operation mode of the interleaved converter, an intermediate-load operation mode in which a load power range is lower than a load power range of the high-load operation mode and higher than a load power range of the low-load operation mode and, in the intermediate load operation mode, configures (n/m) series inductor circuits by connecting m (m is 1 and divisors of n other than n) pieces of the inductors in series and configures (n/m) third switching converter circuits using one of the series inductor circuits, one of the switching elements, and one of the diodes for each of the (n/m) third switching converter circuits; and
the control circuit calculates load power on a basis of a load voltage applied to the load and a load current flowing into the load or a voltage of the alternating-current power supply and an input current input from the alternating-current power supply and switches the operation mode according to calculated load power, and as a condition for switching the operation mode, the control circuit sets a first load power threshold for shifting the operation mode from the high-load operation mode to the intermediate-load operation mode to a value lower than a second load power threshold for shifting the operation mode from the intermediate-load operation mode to the high-load operation mode and sets a third load power threshold for shifting the operation mode from the intermediate-load operation mode to the low-load operation mode to a value lower than a fourth load power threshold for shifting the operation mode from the low-load operation mode to the intermediate-load operation mode.

5. The interleaved converter according to claim 4, wherein, in the intermediate-load operation mode, the control circuit drives (n/m) pieces of the switching elements configuring the (n/m) third switching converter circuits such that electric currents flowing to (n/m) pieces of the inductors have a phase difference of (360°/(n/m)) relative to each other.

6. The interleaved converter according to claim 4, wherein the control circuit switches the operation mode according to operation mode request information externally input.

7. The interleaved converter according to claim 4, wherein, in the high-load operation mode, the control circuit drives n pieces of the switching elements such that electric currents flowing to n pieces of the inductors have a phase difference of (360°/n) relative to each other.

8. The interleaved converter according to claim 7, wherein, in the intermediate-load operation mode, the control circuit drives (n/m) pieces of the switching elements configuring the (n/m) third switching converter circuits such that electric currents flowing to (n/m) pieces of the inductors have a phase difference of (360°/(n/m)) relative to each other.

* * * * *